United States Patent
FitzPatrick

(10) Patent No.: US 12,090,638 B2
(45) Date of Patent: Sep. 17, 2024

(54) ROBOTIC TOOL CHANGER HAVING DEBRIS PASSAGES FOR CHANNELING DEBRIS FROM THE BALL-LOCKING MECHANISM

(71) Applicant: ATI Industrial Automation, Inc., Apex, NC (US)

(72) Inventor: Brendon FitzPatrick, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 1059 days.

(21) Appl. No.: 17/002,043

(22) Filed: Aug. 25, 2020

(65) Prior Publication Data

US 2022/0063037 A1    Mar. 3, 2022

(51) Int. Cl.
B25J 15/04    (2006.01)
B25J 19/00    (2006.01)

(52) U.S. Cl.
CPC ....... *B25J 15/0408* (2013.01); *B25J 15/0416* (2013.01); *B25J 19/0058* (2013.01)

(58) Field of Classification Search
CPC .............. B25J 15/0408; B25J 15/0416; B25J 19/0058; B23Q 11/0053; B23B 31/1071; B23B 31/22
See application file for complete search history.

(56) References Cited

U.S. PATENT DOCUMENTS

| | | | |
|---|---|---|---|
| 2,499,781 A * | 3/1950 | Rothenberger | B23B 31/22 279/2.12 |
| 8,005,570 B2 | 8/2011 | Gloden et al. | |
| 8,132,816 B2 | 3/2012 | Norton et al. | |
| 8,209,840 B2 | 7/2012 | Norton | |
| 8,500,132 B2 | 8/2013 | Norton | |
| 8,533,930 B2 | 9/2013 | Norton | |
| 8,601,667 B2 | 12/2013 | Norton | |
| 8,794,418 B1 | 8/2014 | Norton | |
| 9,151,343 B2 | 10/2015 | Norton | |
| 9,724,830 B2 | 8/2017 | Norton et al. | |
| 10,335,957 B2 | 7/2019 | Zachary et al. | |
| 2007/0228671 A1 | 10/2007 | Norton | |

FOREIGN PATENT DOCUMENTS

| | | | | |
|---|---|---|---|---|
| CN | 1586776 A | 3/2005 | | |
| CN | 1672838 A | 9/2005 | | |
| CN | 101264605 A | 9/2008 | | |
| CN | 104470662 A | 3/2015 | | |
| CN | 106426244 A | 2/2017 | | |
| DE | 102004020228 A1 * | 11/2005 | ......... | B23B 31/1071 |
| DE | 102016222287 A1 | 5/2017 | | |
| JP | H11339875 A | 12/1999 | | |

* cited by examiner

*Primary Examiner* — Eric A. Gates
*Assistant Examiner* — Reinaldo A Del Vargas Rio
(74) *Attorney, Agent, or Firm* — COATS & BENNETT, PLLC

(57) ABSTRACT

A robotic tool changer includes master and tool assemblies that are coupled by urging a plurality of rolling members contained in openings in the master assembly into contact with a bearing race contained in the tool assembly. Accumulations of debris in and around the contact points between the rolling members and bearing race are permitted to escape via a series of debris passages formed between the rolling members and the openings when the master and tool assemblies are coupled.

6 Claims, 3 Drawing Sheets

ROBOTIC TOOL CHANGER HAVING DEBRIS PASSAGES FOR CHANNELING DEBRIS FROM THE BALL-LOCKING MECHANISM

FIELD OF THE INVENTION

The present invention relates to robotic tool changers.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

A ball-lock configuration is commonly deployed in robotic tool changers as a coupling mechanism. In one such configuration, a plurality of rolling members, such as steel balls, is contained in bores or openings formed in a collar of a master assembly. The balls are driven radially, such as by an advancing piston, and advance to bear against a bearing race in the tool assembly, mechanically coupling the master and tool assemblies together. To decouple, the piston is retracted, and the balls retreat into the collar as the master assembly separates from the tool assembly. Various configurations, driving mechanisms, and operational aspects of such ball-lock configurations are described in U.S. Pat. Nos. 8,005,570; 8,132,816; 8,209,840; 8,500,132; 8,533,930; 8,601,667; 8,794,418; 9,151,343; 9,724,830; and 10,335,957. All of these patents are assigned to the assignee of the present application, and the disclosures of all of them are incorporated herein by reference in their entireties.

In a coupled state, the steel balls, while retained in the collar, project slightly outwardly from the outer edges of the bores to engage the bearing race of the tool assembly. The outer edge of the bores has a diameter smaller than the steel balls. When the balls are forced into engagement with the bearing race, the outer edges of the bores are generally closed by the steel balls. That is, the steel balls set flush against the outer edges of the bores such that there is essentially no open area between the steel balls and the outer edges of the bores.

Robotic tool assemblies are varied and are used in a wide variety of applications. For example, in an automobile manufacturing application, a robotic tool assembly may be utilized to cut, grind, blast or otherwise shape metal parts during a production run, and perform a variety of spot welding tasks in another run. This cutting, grinding, blasting and welding generates dust and debris, such as minute metal particles. Dust and debris can accumulate on the contact surfaces of the locking mechanism when the tool and master assemblies are coupled. Debris contamination in the locking mechanism often results from tool drop-offs as the tool changer may have residual debris or media (for example, shot peen) from a blasting operation that could fall into the locking mechanism after tool drop-off and even during tool pickup. In addition, depending on the size of the debris, the debris can also enter the tool changer and accumulate on the locking mechanism even while the master and tool assemblies are coupled.

The present invention discloses a robotic tool changer design that facilitates and enables the debris to escape from the locking mechanism.

SUMMARY OF THE INVENTION

In one embodiment, the robotic tool changer includes master and tool assemblies. Master assembly includes a plurality of rolling members contained in openings formed in an annular collar. The tool assembly includes a bearing race. To couple the master and tool assemblies, the rolling members of the master assembly are urged into tight engagement with the bearing race of the tool assembly. Openings containing the rolling members are designed such that when the rolling members are extended and engaged with the bearing surface of the tool assembly, one or more debris passages is formed between each rolling member and the opening. This enables dust, debris, media, etc. that is present in and around the contact surfaces of the rolling members and bearing race to escape.

Openings containing the rolling members include inner and outer ends. The outer ends of the openings engage the rolling members and only allow the rolling members to partially protrude from the outer end. In one embodiment, the outer ends engage circumferentially spaced points or areas about the rolling members. Portions of the outer ends of the openings extend outwardly beyond the rolling members and form the debris passages that extend between the outer end of the openings and the rolling members therein.

In another embodiment, the points or areas of contact between the outer ends of the openings and the rolling members contained therein lie on virtual circles.

Other objects and advantages of the present invention will become apparent and obvious from a study of the following description and the accompanying drawings which are merely illustrative of such invention.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DESCRIPTION OF EXEMPLARY EMBODIMENTS

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
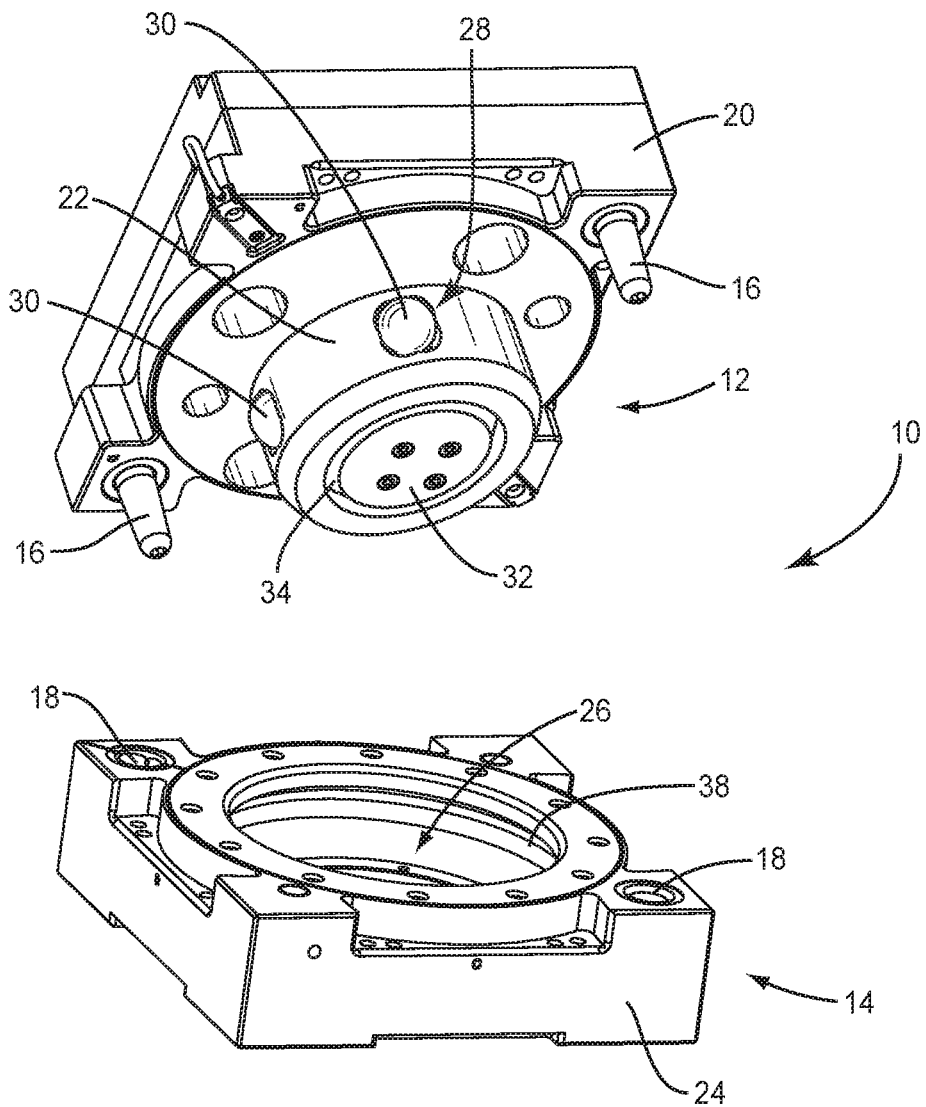
FIG. 1 is a perspective view of a robotic tool changer showing the master and tool assemblies uncoupled.
Figure 2:
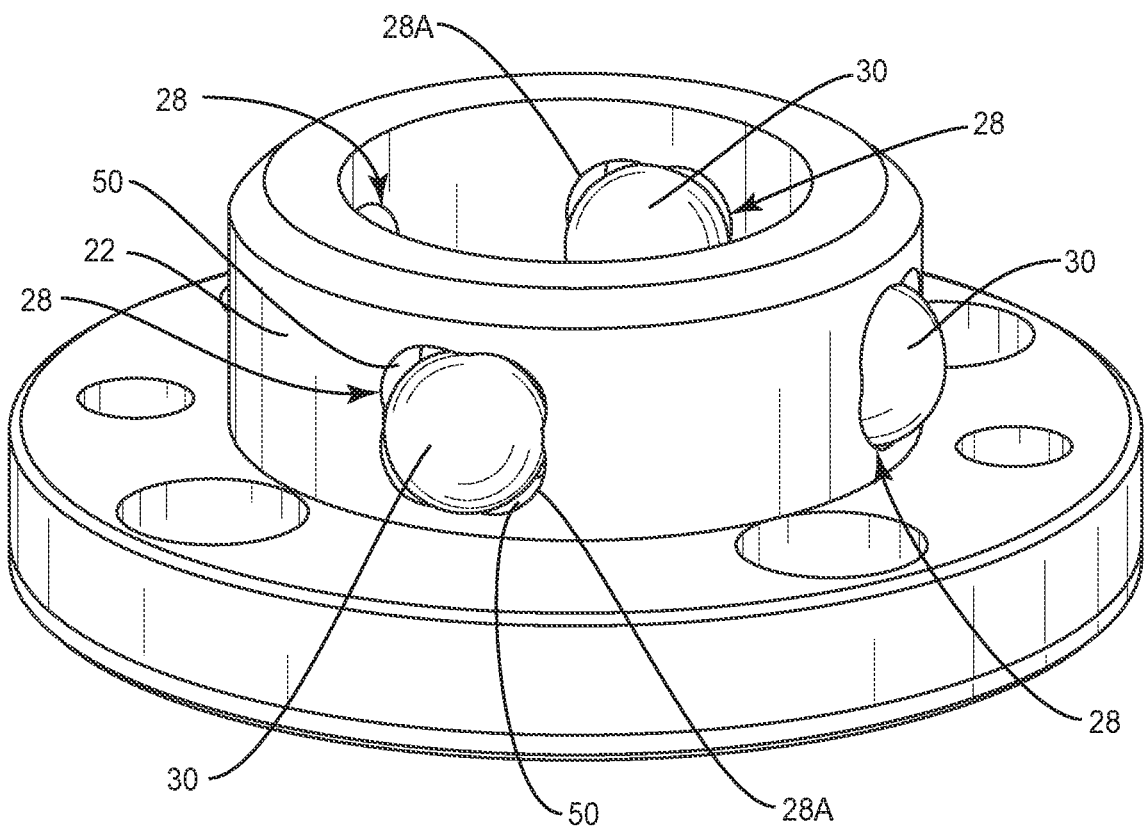
FIG. 2 is a perspective view of an annular collar disposed in the master assembly and including debris passages formed between openings in the collar and the rolling members contained therein.

FIG. 1 shows a robotic tool changer 10 which employs a ball-lock coupling mechanism. One half of the robotic tool changer 10, called the master assembly 12, is permanently affixed to a robot arm (not shown). The other half, called the tool assembly 14, is affixed to each tool (not shown) that the robot may utilize. In any particular application, these mountings may be reversed. Accordingly, as used herein, the term "master" and "tool" are terms of reference. As seen in FIG. 1, alignment pins 16 on the master assembly 12 mate with alignment bushings 18 on the tool assembly 14 to insure proper alignment of the master and tool assemblies 12, 14 when the assemblies are coupled together.

Master assembly 12 includes a housing 20 and an annular collar 22 protruding therefrom and extending beyond the plane of the face of the housing 20. Tool assembly 14 includes a housing 24 and a circular chamber 26 formed therein. Disposed in the chamber 26 is a bearing race 38. When the master and tool assemblies 12, 14 are coupled, collar 22 is disposed within the chamber 26 and is spaced inwardly from the bearing race 38.

A plurality of openings 28 are formed in the collar 22. Openings 28 extend between outer and inner sides of the collar 22 and include outer and inner ends. Contained in each of the openings is a moveable rolling member 30. As discussed more fully below, the rolling members 30 are moveable between a retracted position and an extended position. In the extended position, the rolling members 30 project through the outer ends of the openings and engage the bearing race 38 and act to couple the master and tool assemblies 12 and 14.

In one embodiment, a cam 32 affixed to the end of a pneumatic piston is disposed within the interior space defined by the collar 22. Cam 32 has at least one tapered surface 34 which contacts the rolling members 30 during coupling of the master and tool assemblies. Cam 32 moves between a retracted position and an extended position. Movement of the cam 32 is controlled by a robotic controller (not shown). As cam 32 moves from the retracted position to the extended position, the tapered surface 34 engages the rolling members 30 and urges them outwardly through the openings 28. In the fully extended position, cam 32 moves the rolling members 30 into tight contact with the bearing race 38 formed in the tool assembly 14. When this occurs, the master and tool assemblies 12, 14 are coupled. In some embodiments, the rolling members 30 may be advanced by a mechanism other than a cam attached to a pneumatic piston, as described in U.S. Pat. Nos. 8,132,816 and 8,209,840, the disclosures of which are expressly incorporated herein by reference.

Openings 28 are configured to form debris passages 50 through the openings when the master and tool assemblies 12, 14 are coupled. Debris is broadly used to mean dust, small and minute particles, blasting media and any loose material found in and around the robotic tool changer 10. This enables debris in and around the rolling members 30 and bearing race 38 to escape through the debris passages 50 when the master and tool assemblies 12, 14 are coupled.

Fundamentally, the cross-sectional area of the openings 28 must be greater than the cross-sectional area of the rolling members 30 in order to form these debris passages. Yet the outer ends of the openings must sufficiently contact the rolling members 30 to retain them in the extended position when the master and tool assemblies 12, 14 are decoupled. To achieve this, openings 28 can assume various shapes and dimensions and the contact points between the rolling members 30 and the openings 28 can vary.

FIGS. 2-4A show an exemplary design for the openings 28. Each opening 28 assumes a generally clover leaf configuration. The cross-sectional area of the opening 28 typically decreases from the inner side of the collar 22 towards the outer side of the collar. In this design, the outer ends of the openings 28 are configured to: (1) permit the rolling members 30 to partially protrude outwardly from the openings sufficient to contact the bearing race 38 of the tool assembly 14 when the master and tool assemblies 12, 14 are coupled together; (2) sufficiently contact the rolling members to prevent them from being pushed out the outer ends of the openings when the master and tool assemblies 12, 14 are decoupled; and (3) form debris passages 50 between the openings and the rolling members therein.

Figure 3:
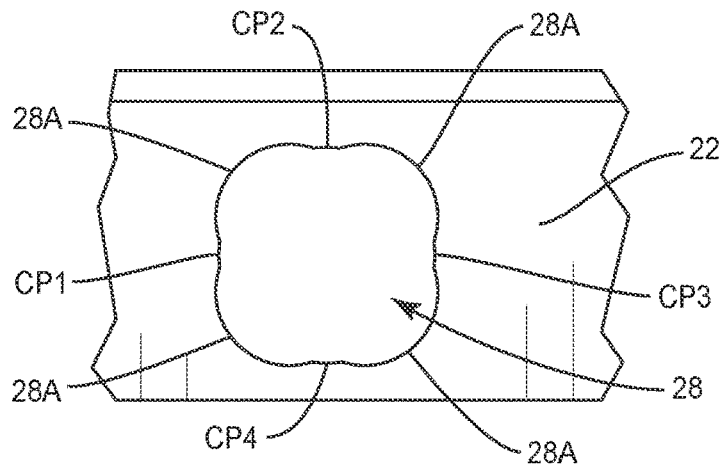
FIG. 3 illustrates an exemplary configuration for the outer end of an opening that contains the rolling member and which is designed to form at least one debris passage.

FIG. 3 is an elevational view showing the outer end of the cloverleaf opening 28. The perimeter of the opening 28, as viewed in FIG. 3, includes four arcuate segments 28A. Respective pairs of the arcuate segments 28A meet to form rolling member contact points or areas referred to in FIG. 4 by CP1, CP2, CP3 and CP4. Hence, there are defined four debris passages 50 spaced around the rolling member when the rolling member is in the extended position and in contact with the bearing race 38. Note that the individual debris passages 50 are open to the entire opening 28 on the inner side of the rolling member 30.

When the master and tool assemblies 12, 14 are decoupled, and a robot moves the master assembly 12 away from the tool assembly 14 (for example, to attach to a different robotic tool), rolling members 30 must be retained within their respective openings 28. In the prior art, this was accomplished by the outer end of the openings 28 being circular, and each having a diameter at least slightly less than the diameter of a rolling member 30. According to embodiments of the present invention, due to the debris passages 50, the openings 28 are not circular, but nevertheless must retain the rolling members 30. This is ensured if at least some of the contact points or areas CP1, CP2, CP3, CP4 lie along, or define, a virtual circle having a diameter less than the diameter of the rolling member 30, while the debris passages 50 extend outwardly beyond this virtual circle.

Thus, when the master and tool assemblies 12, 14 are coupled and even while the tool assembly is performing work, debris in and around the rolling members 30 and the bearing race 38 can escape and move inwardly through the debris passages. By providing an avenue for the debris to pass from the bearing race 38 and rolling members 30, the locking mechanism is maintained cleaner, operates smoother, and there is less debris to interfere with contact between the rolling members and the bearing race.

Figure 4:
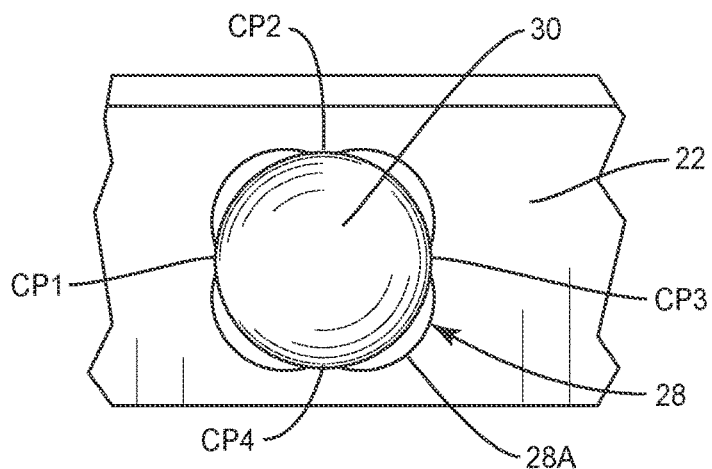
FIG. 4 is a side elevational view showing the contact points or areas between a rolling member and the opening containing the rolling member.
Figure 4A:
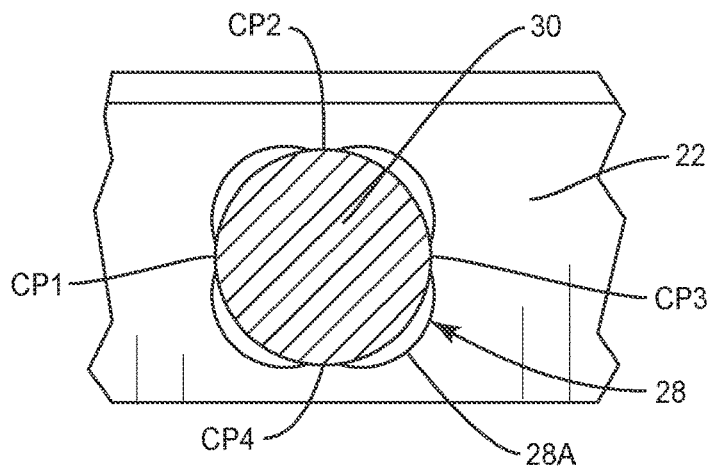
FIG. 4A is a view similar to FIG. 4 but shows the rolling member in sections.

In this case of the embodiment shown in FIGS. 3-4A, the contact points and the debris passages are uniformly spaced around the rolling member 30. However, the openings 28 can assume various shapes and sizes designed to retain the rolling members 30 in the openings but yet form at least one debris passage 50 between each rolling member and the opening containing the rolling member.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A robotic tool changer comprising:
   a tool assembly including a bearing race;
   a master assembly including:
   an annular collar;
   a plurality of circumferentially spaced openings formed in the annular collar;
   a plurality of rolling members contained in the openings and moveable therein between retracted and extended positions where in the extended position, the rolling members partially protrude from outer edges of the openings;
   a drive mechanism configured to engage the rolling members and force the rolling members into the extended position and in contact with the bearing race of the tool assembly to couple the master and tool assemblies, and to allow the rolling members to retract to decouple the master and tool assemblies; and
   wherein each opening is configured to form one or more debris passages between the rolling member therein and the opening when the rolling member assumes the extended position and engages the bearing race of the tool assembly, wherein each opening assumes a generally cloverleaf configuration and includes a plurality of spaced apart rolling member contact points that engage and retain the rolling member within the opening when the rolling member assumes the extended position.

2. The robotic tool changer of claim 1 wherein each opening is configured to contact a plurality of circumferentially spaced points or areas on the rolling member contained therein when the rolling member assumes the extended position.

3. The robotic tool changer of claim 2 wherein the points or area of contact between each opening and the rolling member contained therein lies on a virtual circle.

4. The robotic tool changer of claim 1 wherein there is provided a plurality of debris passages around each rolling member, each debris passage bounded by the rolling member and a generally arcuate segment of the opening.

5. The robotic tool changer of claim 1 wherein each opening includes a surrounding wall that extends between outer and inner sides of the opening, and wherein each rolling member rolls across the wall as the rolling member moves between the retracted and extended positions.

6. The robotic tool changer of claim 1 wherein the rolling member contact points are uniformly spaced about the circumference of the virtual circle.

* * * * *